Figure 1:
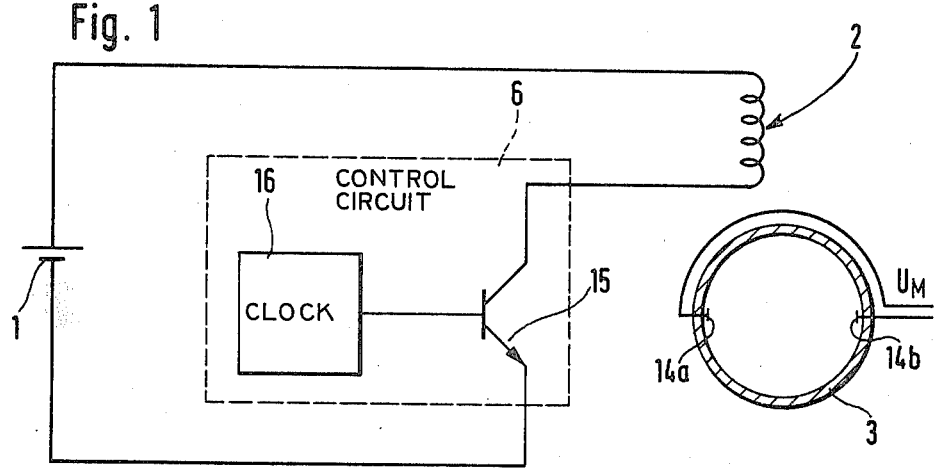

United States Patent [19]

Haug

[11] Patent Number: 4,483,201

[45] Date of Patent: Nov. 20, 1984

[54] MAGNETIC-INDUCTIVE FLOWMETER

[76] Inventor: Peter Haug, Schelmenwasenstrasse 35, 7060 Schorndorf-Haubersbronn, Fed. Rep. of Germany

[21] Appl. No.: 404,550

[22] Filed: Aug. 2, 1982

[30] Foreign Application Priority Data

Aug. 22, 1981 [DE] Fed. Rep. of Germany ....... 3133330

[51] Int. Cl.³ .............................................. G01F 1/60
[52] U.S. Cl. ................................................. 73/861.12
[58] Field of Search ............ 73/861.12, 861.16, 861.17

[56] References Cited

U.S. PATENT DOCUMENTS

| 3,550,446 | 12/1970 | Tucker et al. | 73/861.17 |
|---|---|---|---|
| 3,955,413 | 5/1976 | Steele et al. | 73/861.12 |
| 3,996,797 | 12/1976 | Torimauru et al. | 73/861.16 |
| 4,144,751 | 3/1979 | Yokoyama | 73/861.12 |
| 4,210,022 | 7/1980 | Boss | 73/861.17 |
| 4,290,313 | 9/1981 | Appel et al. | 73/861.17 |
| 4,373,400 | 2/1983 | Sekiguchi | 73/861.16 |

Primary Examiner—Herbert Goldstein
Attorney, Agent, or Firm—George A. Gust

[57] ABSTRACT

A magnetic-inductive flowmeter is disclosed operating with an alternating field but supplied from a source of direct voltage. The inversion is executed with the aid of the excitation coils of the pickup as well as with the aid of a control circuit. In an advantageous embodiment, an oscillator circuit is formed with the aid of the excitation coils and a capacitor so that the power supplied by the source of direct voltage represents only a small portion of the apparent output of the excitation coil. Besides, the provision is made to keep the current through the control circuit and/or its amplitude, or the amplitude of the voltage at the excitation coil, at a constant value, so that the measuring signal is not subject to possible fluctuations of the direct voltage source.

13 Claims, 5 Drawing Figures

MAGNETIC-INDUCTIVE FLOWMETER

The invention relates to a magnetic-inductive flowmeter supplied by a source of direct voltage, with a pickup including a pipe traversed by a liquid and with means comprising an excitation coil for the generation of a magnetic alternating field in the liquid as well as with electrodes, from which electrodes a measuring voltage is derived produced in the liquid and dependent on the throughflow.

Magnetic-inductive flowmeters are known in a variety of designs. Since measurements with DC fields lead to large errors, AC fields are utilized; for this purpose, in several conventional arrangements, the flowmeters are connected to the existing AC mains. The accompanying disadvantage of being dependent on the supply network and on the frequency supplied thereby is circumvented in other arrangements by feeding the flowmeter from a DC voltage source, but in this case means must be provided permitting the production of an AC field from the available DC voltage. Among these means are, in conventional flowmeters, an excitation coil as well as an additional, separate inverter (DC-AC converter), the output signal of which is an AC voltage supplying the excitation coil of the pickup. The thus-generated magnetic alternating field penetrates the liquid, and it is then possible to derive from electrodes mounted within the pipe a measuring voltage produced in the liquid and dependent on the throughflow or flow. The advantages of such an alternating-field operation reside in that also the measuring voltage is available at relatively high frequencies, and that there is always a useful voltage present, so that a satisfactory dynamic characteristic of the measuring process is obtained, i.e. so that even those changes of the measured variable can be processed which occur for a brief period of time and rapidly. This is of importance, for example, if it is intended to measure only relatively small quantities of fluid, as required, for instance, in metered operation in connection with automatic metering systems. Measurements with switched DC fields exhibit the disadvantage, in comparison therewith, that a useful signal can be exploited in all cases only once a transient condition of the built-up field has come into being. Therefore, the output signal cannot be exploited constantly. These advantages of alternating field operation, however, are confronted by the disadvantage that the inverters heretofore required for producing the alternating fields are expensive and voluminous and also exhibit a relatively high power requirement.

The invention is based on the object of providing a magnetic-inductive flowmeter operable independently of an AC voltage supply but, at the same time, able to make do with substantially simpler and less expensive means for the production of an alternating [AC] field, permitting measurments with the aforedescribed advantages, than is the case in the conventional types of construction.

The invention resides in providing, as the means for producing the alternating magnetic field, the excitation coil of the pickup and a control circuit.

The invention is based on the idea that an additional inverter and the transformer usually required therefor, or additional coils, can be eliminated if the excitiion coil proper is employed for generating the alternating field; in this connection, the control circuit can be of a variety of structures. Thereby, a single device can be created from the heretofore required, additional inverter and the flowmeter proper. The entire device thereby becomes substantially less expensive, more manageable, and can be of such a design that it has only a very low power consumption.

For example, a single-ended circuit can be provided as the control circuit by equipping the control circuit with a controlling switching element connected in series with the excitation coil or part of the excitation coil. This controlling switching element then causes periodic current flow through the excitation coil or part of the excitation coil whereby an alternating field is generated. A transistor can be advantageously provided as such a controlling switching element, which transistor is operated as a switch by being controlled with a frequency desired for the alternating field, and thus effecting current flow through the coil at this frequency.

It is advantageous to construct the control circuit as a push-pull circuit, in which case the control circuit has two controlling switching elements, respectively one of which is connected to one end of the excitation coil. The excitation coil is provided with a tap with which it is connected to one pole (terminal) of the DC voltage source, the switching elements being connected to the other pole of the DC voltage source and being controlled in push-pull mode. Thereby the current flow is directed alternatingly from the tap to one of the two ends of the coils, so that by the winding direction and current direction when changing the excitation coils a change in the polarity of the magnetic field is produced and accordingly an alternating field is generated with the aid of the excitation coils and the control circuit. The controlling switching elements can again be transistors.

It is advantageous to connect the excitation coil at a center tap to the DC voltage source. The advantage is then to be seen in that respectively identical currents flow via the thus-formed halves of the excitation coils, equal in the number of windings. Thereby the circuit becomes symmetrical. Advantageously, the two coil halves of the excitation coil can be arranged on mutually opposed sides of the pipe.

In an especially advantageous further development of a symmetrical push-pull circuit, the provision is made to connect a capacitor between the ends of the excitation coil. This capacitor, together with the excitation coil, forms an LC oscillator circuit. The frequency of the oscillator circuit and thus the frequency of the magnetic alternating field can be selected by dimensioning of the capacitor. The losses of the oscillator circuit occurring due to the ohmic resistance of the coil and the eddy current in the iron are covered by the current supplied by the DC voltage source. If the temporal curve of the currents through the two control elements of the push-pull circuit corresponds respectively alternatingly to a sinusoidal half wave, the current supplied will also assume a sinusoidal course, so that also the chronological curve of the thus-produced alternating field becomes sinusoidal.

If the voltage of the DC voltage source is relatively low, as is the case, for example, when using storage batteries, capacitors of a very high capacitance would be needed at the usual frequencies. It is therefore advantageous to provide each half of the excitation coil with an intermediate tap to which is respectively connected a control element of the control circuit. The intermediate taps are arranged symmetrically with respect to the center tap. The voltage at these intermediate taps can be selected so that it does not exceed the voltage of the DC voltage source, or exceeds this voltage only insubstantially. The voltage at the entire excitation coil and at the capacitor can, however, be chosen to be arbitrarily high by a corresponding number of windings. With an increasing number of windings, the inductance rises. Thereby, the capacitance of the capacitor becomes smaller at the same frequency. Such capacitors are inexpensive and also available commercially. The frequency of the alternating field generated by the capacitor and the excitation coil is substantially constant. A further advantage resides in that energy need only be supplied for compensating for the losses of the oscillator circuit.

The control circuit can be designed as an oscillatory circuit, for example as a multivibrator, so that the frequency of the current in the excitation coil is dependent on the frequency of the oscillatory circuit. However, it is more advantageous to have the frequency determined by the oscillator circuit formed by the excitation coil and the capacitor. The control circuit is then designed together with the coil and the capacitor as a self-oscillating circuit.

Since the measuring voltage, dependent on the flow through the pipe, has differing values for identical flow quantities if the amplitude of the alternating magnetic field generated in the excitation coils is subject to fluctuations, it is advantageous to provide for a constant alternating magnetic field. This can be done by arranging a constant-current circuit with which the current through the control circuit and through the excitation coil is kept constant. However, it is also advantageous to design the control circuit proper so that it maintains the current, supplied by the DC voltage source and covering the losses of the oscillator circuit formed from the excitation coil and the capacitor, at a constant value. In case the losses are constant as well, a field of constant amplitude results with constant current.

Figure 2:
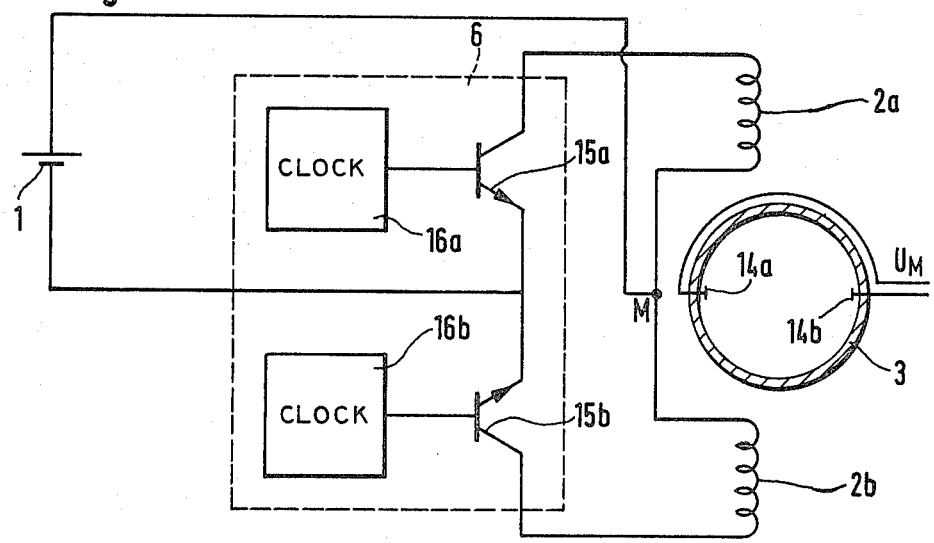
Figure 3:
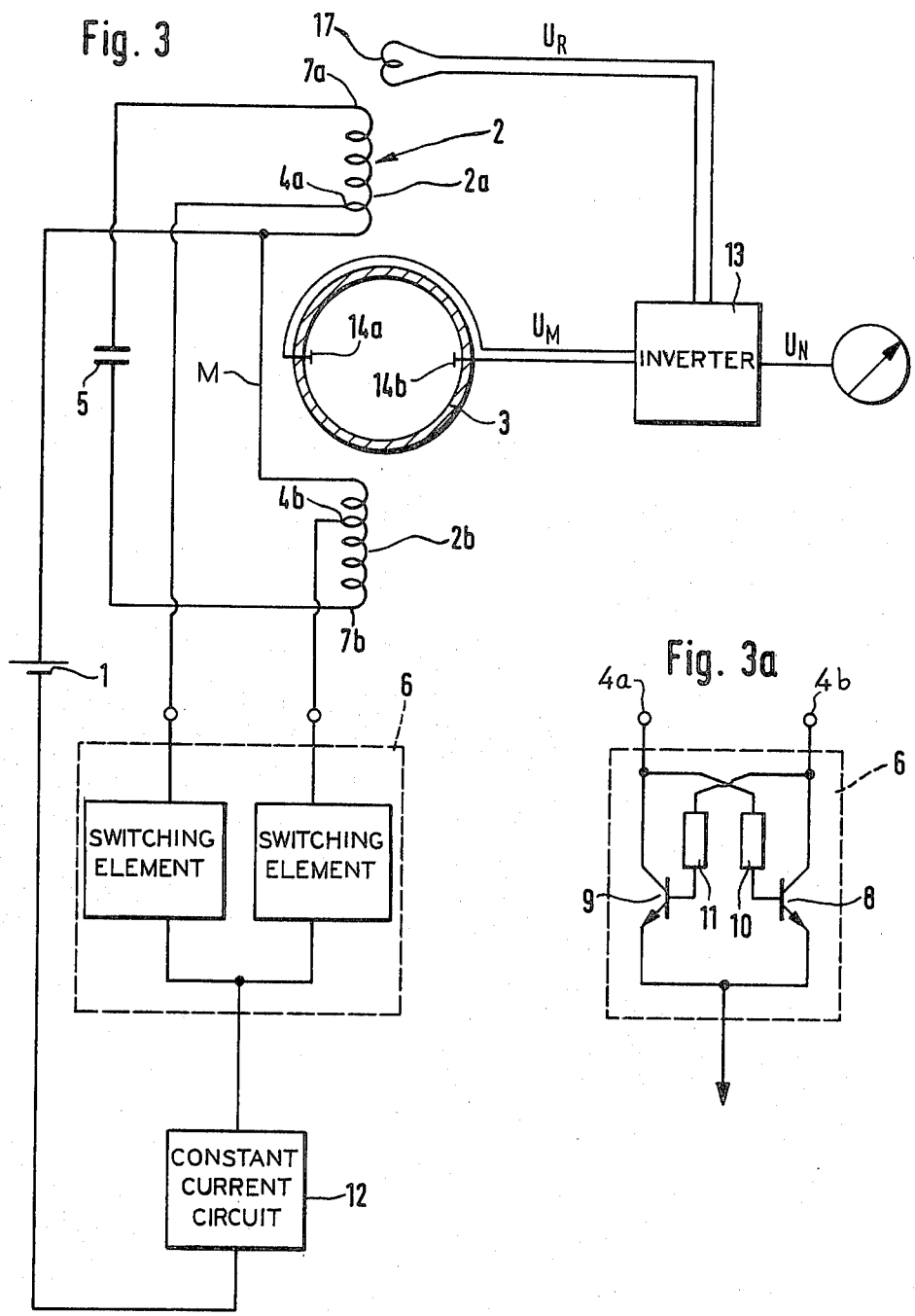
Figure 4:
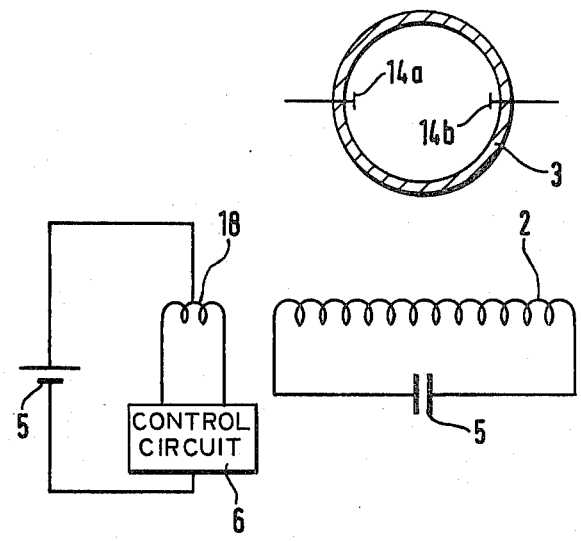

The invention will be explained and described below with reference to the figures, showing the principle of the invention, by way of example. In the drawings:

FIG. 1 shows a sketch, in principle, of a magnetic-inductive flowmeter according to the invention, operating in single-ended mode, FIG. 2 shows a sketch, in principle, of a magentic-inductive flowmeter according to the invention, operating in push-pull mode, FIG. 3 shows another embodiment of a magnetic-inductive flowmeter according to the invention, FIG. 3a shows an embodiment of a self-oscillating control circuit, in principle, and FIG. 4 shows an illustration, in principle, of the magnetic-inductive flowmeter shown in FIG. 3.

In FIG. 1, numeral 1 denotes a source of DC voltage, with the aid of which the magnetic-inductive flowmeter is supplied; the flowmeter comprises a pickup with a pipe 3 traversed by a liquid, as well as an excitation coil 2. A measuring voltage $U_M$ is obtained at the electrodes 14a and 14b in dependence on an alternating field in the excitation coil 2, produced in a way described below, and on the flow volume through the pipe 3.

According to the invention, the excitation coil 2 of the pickup and a control circuit 6 are provided for producing the alternating field. In the embodiment shown in FIG. 1, the excitation coil 2 is connected, with the collector-emitter path of a transistor 15, in this case representing the controlling switching element, in series to the DC voltage source 1 with the excitation coil, the transistor being activated by a clock generator 16 producing a frequency, so that an alternating field is generated in single-ended operation.

Also in the embodiment illustrated in FIG. 2, the excitation coil 2 and a control circuit 6 are employed for generation of the alternating field. This control circuit operates in push-pull mode, in that it comprises two controlling switching elements, namely the transistors 15a and 15b, respectively one of these transistors being connected to one end of the excitation winding. The excitation coil has a center tap M with which it is connected to one pole of the DC voltage source. The other pole of the DC voltage source is respectively connected to the emitters of transistors 15a and 15b. Current now flows alternatingly via the transistors 15a and 15 b to respectively one half 2a or 2b of the excitation coil so that an alternating field is likewise generated. The timing [pulse] is determined by the clock generators 16a and 16b, respectively, activating the bases B of the transistors 15a and 15b in push-pull operation.

A preferred embodiment is illustrated in FIG. 3. Here again a DC voltage source 1 is available for supplying the voltage; an alternating field must be generated with the DC voltage from this source. For this purpose, again the excitation coil 2 and a control circuit 6 are utilized, whereby the heretofore necessary inverters can be omitted. At the center tap M of the excitation coil 2, which latter is subdivided into two halves 2a and 2b, located in mutual opposition at the pipe 3, the excitation coil is connected to the DC voltage source 1. The two ends 7a and 7b of the excitation coil 2 are connected to each other via a capacitor 5, whereby an LC oscillator circuit is produced. Respectively one intermediate tap 4a and 4b is provided on each coil half 2a and 2b, this intermediate tap connecting the respective coil halves with the control circuit 6. By way of the control circuit, a current is supplied corresponding to the losses (ohmic resistance of the coil and eddy current in the iron) of the oscillator circuit. Thereby the DC voltage source need only deliver an output corresponding to a small portion of the apparent output of the excitation coil.

In dimensioning the oscillator circuit with the predetermined frequency, which latter is dependent on the capacitance of the capacitor 5 and on the inductance of the excitation coil, the difficulty is encountered that with a coil and capacitor voltage similar to the supply voltage, for example 24 volt, a capacitor 5 would be required having a capacitance making the capacitor too large and too expensive. However, if the number of turns is increased, as is the case in the illustrated embodiment, the inductance rises and consequently the capacitance value of the capacitor drops to customary values so that relatively inexpensive and small capacitors can be utilized. The voltage at the intermediate taps 4a and 4b now is similar to the supply voltage, for example 24 volt, while the voltage at the two coil ends and thus at the capacitor 5 is substantially higher.

The control circuit 6 can be used for giving the supplied current a sinusoidal curve. This current can be fed with a frequency independent of the frequency of the LC oscillator circuit, but it is advantageous for the oscillator circuit formed from excitation coil 2 and capacitor 5 to determine the frequency. The control circuit is then designed, together with the coil and the capacitor as a self-oscillating circuit as can be seen from FIG. 3a. With this control circuit, two transistors 8 and 9 are utilized connected respectively with their collectors to the intermediate taps 4a and 4b as well as via the resistors 10 and 11 to the bases of the respective other transistors. The thus-formed oscillatory circuit oscillates at the frequency of the LC oscillator circuit and handles a corresponding supply of a current from the DC voltage source 1, compensating for the losses of the oscillator circuit.

The structure of the embodiment shown in FIG. 3. in principle can also be seen from the schematic view of FIG 4. It can be seen especially clearly from this latter figure that the excitation coil 2, together with the capacitor 5, forms an oscillator circuit which is self-oscillating, the magnetic field being generated predominantly from the current of the oscillator circuit. Only the losses of the oscillator circuit are introduced via a winding 18 which latter is connected by the control circuit 6 in synchronism with the clock pulse to the DC voltage source 5. In the embodiment shown in FIG. 3, the winding 18 is formed by the excitation coil 2 respectively between the center tap M and the intermediate tap 4a or 4b.

With the aid of the constant current circuit 12 illustrated in FIG. 3, the current is regulated to be constant through control circuit 6, providing constant conditions when generating the alternating field, so that the measuring voltage $U_M$ no longer needs to be corrected in correspondence with the possible fluctuations of the alternating field, obtaining a simplification of the total number of components of the arrangement. The control circuit 6 proper, however, can also be designed just as well in such a way that it maintains the current derived from the DC voltage source at a constant value. If the losses of the oscillator circuit are constant, then, with constant current, an alternating field is obtained, the amplitude of which is likewise constant.

If there were no constant current circuit 12, then a reference signal $U_R$, obtained via an additionally arranged coil 17 in dependence on the alternating field generated in the excitation coils 2, would have to detect the fluctuations of the alternating field. The measuring voltage $U_M$ can then be corrected in a converter 13 in correspondence with the reference voltage $U_R$, subsequently obtaining the useful signal $U_N$.

An arrangement of a magnetic-inductive flowmeter in accordance with this invention offers the advantage that no additional inverters are required any longer, since the alternating field is provided solely by way of the excitation coil 2 and the control circuit 6. One advantage in this connection is that any desired frequencies can be attained; in an embodiment such as FIG. 3, there is the additional advantage that only a very low power consumption occurs in the pickup. By means of current regulation, it is also possible to build up a constant, sinusoidal alternating field, obtaining independence from the actual supply voltage over wide ranges. Also, a constant useful signal is present, so that all of the advantages of the conventional alternating field measurements are achieved without incurring the disadvantage of using additional inverters.

While there have been described above the principles of this invention in connection with specific apparatus, it is to be clearly understood that this description is made only by way of example and not as a limitation to the scope of the invention.

What is claimed is:

1. Magnetic flowmeter apparatus comprising a pipe adapted to receive a flow of liquid therethrough, means for generating an alternating magnetic field of sinusoidal wave form within said pipe; said means including an inductor, a source of unidirectional voltage and a control circuit; said control circuit coupling said source to said inductor; said source, said inductor and said control circuit further being connected as an oscillator which serves in generating a current of sine wave form for said inductor to produce said field, said inductor being in the form of an excitation coil and which serves in determining the frequency of said oscillator, and means for measuring the voltage induced by said field within the liquid flowing through said pipe.

2. The apparatus of claim 1 wherein said control circuit includes a switching element connected between said source and said coil.

3. The apparatus of claim 2 wherein said switching element includes a transistor having the collector and emitter connected in series between said source and said coil.

4. The apparatus of claim 1 wherein said coil is in two sections on opposite sides of said pipe and which are connected in series, said control circuit including two transistors connected to said two coil sections.

5. The apparatus of claim 1 including a capacitor connected across said coil to form with said source and control circuit an LC oscillator.

6. The apparatus of claim 1 including means for maintaining the magnitude of said alternating field substantially uniform.

7. The apparatus of claim 6 wherein said maintaining means includes a current regulator for said source.

8. Magnetic flowmeter apparatus comprising a pipe adapted to receive a flow of liquid therethrough, means for generating an alternating magnetic field within said pipe; said means including an inductor, a source of unidirectional voltage and a control circuit; said control circuit coupling said source to said inductor; said source, said inductor and said control circuit further being connected as an oscillator to produce said field, said inductor being in the form of an excitation coil disposed adjacent to said pipe which provides the aforesaid magnetic field, means for measuring the voltage induced by said field within the liquid flowing through said pipe, said coil being in two sections on opposite sides of said pipe and which are connected in series, said control circuit including two transistors connected to said two coil sections and source in push-pull circuit configuration, wherein the emitters of said transistors are connected and the collectors thereof being connected to the outer ends, respectively, of said two coil sections, said source being connected between the junction of said two coil sections and said emitters, and two clocks connected to the bases, respectively, of said transistors.

9. The apparatus of claim 8 wherein said juncture constitutes the center tap of the inductor composed of said two coil sections.

10. Magnetic flowmeter apparatus comprising a pipe adapted to receive a flow of liquid therethrough, means for generating an alternating magnetic field within said pipe; said means including an inductor, a source of unidirectional voltage and a control circuit; said control circuit coupling said source to said inductor; said source, said inductor and said control circuit further being connected as an oscillator to produce said field, said inductor being in the form of an excitation coil disposed adjacent to said pipe which provides the aforesaid magnetic field, means for measuring the voltage induced by said field within the liquid flowing through said pipe, a capacitor connected across said coil to form with said source and control circuit on LC oscillator, said coil being in two sections on opposite sides of said pipe and which are connected in series, said source being connected to the juncture of said coil sections, said control circuit being connected to two taps, respectively, symmetrically located on said two sections, respectively.

11. The apparatus of claim 10 wherein said control circuit includes two transistors having the emitters connected, the collectors connected to said taps, respectively, and the bases connected to the collectors of the other transistors by means of two resistors, respectively, the frequency of the alternating field being determined by the coil and capacitor combination.

12. The apparatus of claim 10 wherein the frequency of the alternating field is determined in part by said control circuit.

13. The apparatus of claim 12 including means for maintaining the current supplied by said source substantially uniform.

* * * * *